R. SCOTT.
Cheese Turner.
No. 53,048.
Patented March 6, 1866.
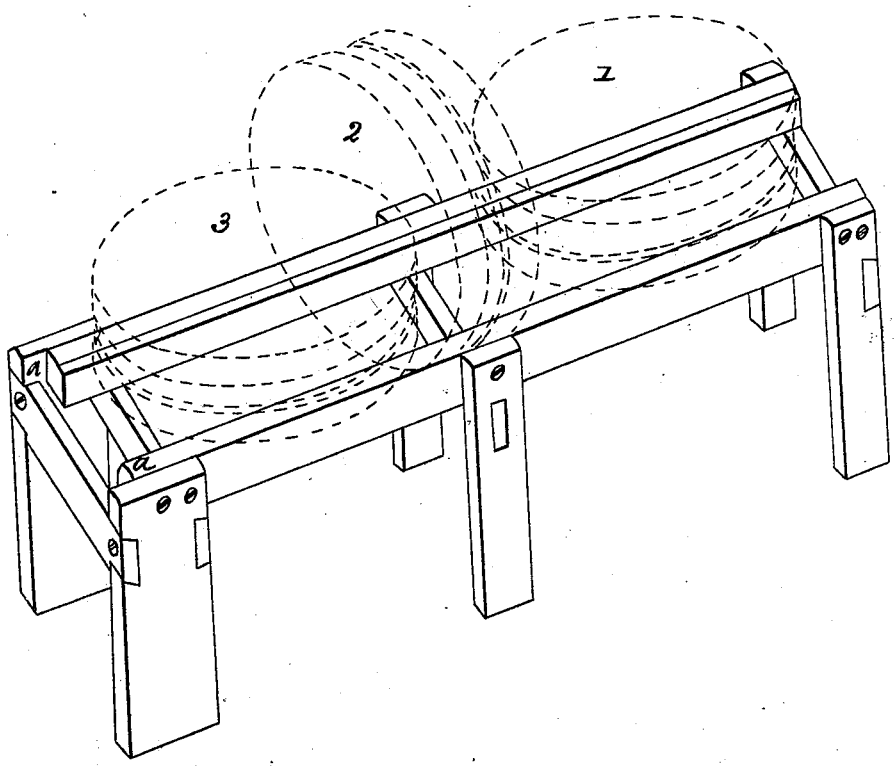

UNITED STATES PATENT OFFICE.

RUFUS SCOTT, OF WATERTOWN, NEW YORK.

IMPROVEMENT IN TURNING CHEESE.

Specification forming part of Letters Patent No. 53,048, dated March 6, 1866.

*To all whom it may concern:*

Be it known that I, RUFUS SCOTT, of Watertown, in the county of Jefferson and State of New York, have invented certain new and useful Improvements in Rail-Counter and Turner for the Manufacture of Cheese; and I hereby declare that the following is a full, clear, and exact description, reference being had to the accompanying drawings.

The nature of my invention consists in the construction of a rail-counter or drying-bench, and in the employment, in connection therewith, of circular flanged disks or turners to facilitate the operation of turning cheese, in the manner substantially as hereinafter described.

When the cheese is brought to the drying-room it is usually placed upon a counter or bench of ordinary construction—*i. e.*, consisting of a board supported by legs in the fashion of a long table. The outer surface or rind of the cheese is just hard enough to preserve the form of the cheese for a short period of time. The inner portion is soft, and at the center is almost of a liquid consistency.

In order to secure that the cheese shall be of equal consistency throughout, and to prevent the liquid matter from settling in any one part, it is necessary to turn the cheese once a day for a period of thirty days, more or less. This is an operation of some difficulty, requiring much labor, and the cheese must be very carefully handled to escape injury. Where there are many cheeses to be handled much time will be consumed in the work of turning them, and to do this work will require the whole strength of a man.

What I propose by my invention is to obviate this difficulty and to effect a saving of both time and labor. I use a series of circular flanged disks or turners, into which the cheeses are put when ready to be taken to the drying-room. These turners, with the cheeses in them, are then placed, not on a bench of ordinary construction such as is commonly used, but on a rail-counter, as seen in the accompanying drawings, the bottom of the disk or turner resting on the two rails. After the cheeses are thus placed but one auxiliary disk is needed in order to turn them. In turning the cheese this auxiliary disk is placed on the top of the cheese, as indicated in the figure by blue lines in the accompanying drawings. The cheese is then turned upon its side, as seen in the figure marked 2. This operation is much facilitated by the open space between the rails, which enables the hand to be placed under the lower turner without difficulty. The cheese is then turned again until it is in the position seen in the figure marked 3. The auxiliary disk or turner is now underneath and rests upon the rail-counter. That which has now become the upper turner is removed and applied to the next cheese, when the same operation is repeated until all the cheeses are turned.

The inner edges of the rails may be beveled in order that the cheese may have a firmer and more secure support when in the position seen at 2.

It will be understood that but one section of the rail-counter is shown in the drawings. The counter may be extended indefinitely without any break in the continuity of the rail, by making a notch or recess (marked *a* in the drawings) into which the projecting rails of the next section of the counter will fit.

Having thus described my improvements, what I claim as my invention, and desire to secure by Letters Patent, is—

1. The method herein described of turning cheese for the purpose of drying the same by the employment of a rail-counter and turning-disks, substantially as herein set forth.

2. The use and employment of circular flanged disks, in combination with a rail-counter, substantially as and for the purposes herein set forth.

In testimony whereof I have signed my name to this specification before two subscribing witnesses.

RUFUS SCOTT.

Witnesses:
JOS. L. COOMBS,
EDM. F. BROWN.